(12) United States Patent
Mupende et al.

(10) Patent No.: US 10,807,841 B2
(45) Date of Patent: Oct. 20, 2020

(54) HOIST DRUM AND FIBER ROPE DRIVE HAVING SUCH A HOIST DRUM

(71) Applicant: LIEBHERR-COMPONENTS BIBERACH GMBH, Biberach an der Riss (DE)

(72) Inventors: Ilaka Mupende, Neu-Ulm (DE); Norbert Hausladen, Biberach (DE); Steven Kreyssig, Hochdorf (DE); Nikolaj Horst, Ehingen (DE); Horst Zerza, Biberach (DE)

(73) Assignee: LIEBHERR-COMPONENTS BIBERACH GMBH, Biberach an der Riss (AT)

( * ) Notice: Subject to any disclaimer, the term of this patent is extended or adjusted under 35 U.S.C. 154(b) by 268 days.

(21) Appl. No.: 15/765,994

(22) PCT Filed: Oct. 4, 2016

(86) PCT No.: PCT/EP2016/001641
§ 371 (c)(1),
(2) Date: Apr. 4, 2018

(87) PCT Pub. No.: WO2017/059953
PCT Pub. Date: Apr. 13, 2017

(65) Prior Publication Data
US 2018/0290866 A1    Oct. 11, 2018

(30) Foreign Application Priority Data
Oct. 5, 2015    (DE) .................. 10 2015 012 819

(51) Int. Cl.
*B66D 1/34*    (2006.01)
*B66D 1/30*    (2006.01)
*F16G 11/00*    (2006.01)

(52) U.S. Cl.
CPC ................. *B66D 1/34* (2013.01); *B66D 1/30* (2013.01); *F16G 11/00* (2013.01)

(58) Field of Classification Search
CPC ... F16G 11/00; B66D 1/30; B66D 2700/0183; B66D 1/34
See application file for complete search history.

(56) References Cited

U.S. PATENT DOCUMENTS

| 823,401 A | 6/1906 | Ferris |
| 2,846,162 A | 8/1958 | Allin, Sr. et al. |
| (Continued) | | |

FOREIGN PATENT DOCUMENTS

| CN | 202785430 U | 3/2013 |
| DE | 35543 C | 5/1886 |
| (Continued) | | |

OTHER PUBLICATIONS

ISA European Patent Office, International Search Report Issued in Application No. PCT/EP2016/001641, dated Jan. 4, 2017, WIPO, 4 pages.

*Primary Examiner* — Sang K Kim
*Assistant Examiner* — Nathaniel L Adams
(74) *Attorney, Agent, or Firm* — McCoy Russell LLP

(57) ABSTRACT

A hoist drum for a fiber rope drive for high-strength fiber ropes such as crane hoists, boom adjustment or trolley traveling gear, and the like, comprising a drum body for winding up the fiber rope, guard plates encompassing the drum body, and a rope end fastening apparatus for fastening a rope end to the hoist drum. The rope end fastening apparatus of the hoist drum comprises two strand guiding passages that are disposed next to one another and that lead to a rope deflection element at which the rope end can be turned around and back so that one respective rope strand comes to lie in the two strand guiding passages; and furthermore comprises a clamping apparatus associated with (Continued)

the strand guiding passages for clamping at least the rope strand that is turned back around the rope deflection element in the strand guiding passage associated with the rope strand.

18 Claims, 12 Drawing Sheets

(56) References Cited

U.S. PATENT DOCUMENTS

| | | | | |
|---|---|---|---|---|
| 2,973,941 | A | * | 3/1961 | Lunde .................. B66D 1/34 242/388.5 |
| 3,481,557 | A | | 12/1969 | Miller |
| 2003/0085391 | A1 | | 5/2003 | Noske |
| 2013/0240809 | A1 | * | 9/2013 | Krappinger .............. B66D 1/39 254/331 |

FOREIGN PATENT DOCUMENTS

| | | | |
|---|---|---|---|
| DE | 895082 | C | 10/1953 |
| DE | 10154968 | A1 | 5/2003 |
| JP | 2001206675 | A | 7/2001 |
| WO | 2012100939 | A1 | 8/2012 |

* cited by examiner

HOIST DRUM AND FIBER ROPE DRIVE HAVING SUCH A HOIST DRUM

CROSS-REFERENCE TO RELATED APPLICATIONS

The present application is a U.S. National Phase of International Patent Application Serial No. PCT/EP2016/001641, entitled "ROPE DRUM AND FIBER ROPE DRIVE HAVING SUCH A ROPE DRUM," filed on Oct. 4, 2016. International Patent Application Serial No. PCT/EP2016/001641 claims priority to German Patent Application No. 10 2015 012 819.1, filed on Oct. 5, 2015. The entire contents of each of the abovementioned applications are hereby incorporated by reference in their entirety for all purposes.

TECHNICAL FIELD

The present invention relates generally to rope drives working with high-strength fiber ropes such as crane hoists, boom adjustment gear, trolley traveling gear, and the like. The invention here in particular relates to a hoist drum for such a fiber rope drive comprising a drum body for winding up the fiber rope, guard plates encompassing the drum body, and a rope end fastening apparatus for fastening a rope end to the hoist drum.

BACKGROUND AND SUMMARY

Attempts have been made for some time in hoisting technology, in particular with cranes, to replace the customary heavy steel wire ropes with high-strength fiber ropes which consist of high-strength synthetic fibers such as aramid fibers (HMPA), aramid/carbon fiber mixtures, high-modulus polyethylene fibers (HMPE) or poly(p-phenylene-2,6-benzobisoxazole) fibers (PBO) or which at least comprise such fibers. Since the weight of the rope itself to be taken into account for the payload is smaller, the payload or the permitted lifting load can be increased due to the weight saving over steel wire ropes. Particularly with cranes having large lifting heights or in booms or mast adjustment gear using pulley blocks of a high reeve count, considerable rope lengths and thus also a corresponding rope weight arise so that the weight reduction possible through high-strength fiber ropes is very advantageous. In addition to the weight advantage of the fiber rope itself, there is the additional fact that the use of fiber ropes also enables a weight saving in further components. For example, the load hook can be made lighter since less load hook weight is needed for the rope tensioning of a fiber rope. On the other hand, the good flexibility of fiber ropes permits smaller bending radii and thus smaller sheaves or pulleys at the crane, which produces a further weight reduction, in particular in the field of crane booms, so that a substantial load torque increase can be achieved with large crane outreaches.

In addition to the named weight advantages, fiber rope drives are characterized by a considerably greater service life, easier handling, and good flexibility as well as the no longer required rope lubrication.

On the other hand, there are some problems with high-strength fiber ropes that make a simple conversion from a steel wire rope to a fiber rope more difficult. The rope end fastening to the hoist drum is an essential point here. With steel wire ropes, the rope end fastening typically takes place by means of clamping jaws on the outer side of the guard plate where the rope end that had been guided to the outside through an opening in the guard plate is clamped. FIG. 12 shows such a steel wire rope end fastening of typical construction according to which the steel wire rope is led along the guard plate outer side in arcuate form and is clamped tight by means of a plurality of clamping jaws—by means of five clamping jaws in the drawn Figure—that are separate and spaced apart from one another on the guard plate outer side. To reduce the cable pull onto said clamping jaws, at least three safety winches are typically utilized on the hoist drum to reduce the cable pull in the region of the clamping jaws by the wrap friction produced here.

This kind of rope end fastening shown in FIG. 12 provides sufficient security against a release of the rope end with a steel wire rope. In the most frequent cases, the required security against a release of the rope is prescribed by legislation or by classification societies such as DNV.

However, said kind of fastening such as is used for steel wire ropes is not sufficient and is problematic for high-strength fiber ropes. One of the reasons for this is that there are very much lower friction values with a high-strength fiber rope. While the friction value between a steel wire rope and the steel drum amounts to approximately $0.1\mu$, the friction value with the high-strength fiber rope is only at approximately $0.05\mu$. This means that at least seven safety winches would be required for the high-strength fiber rope for the same tensile force to achieve the same retention force by wrap friction. In addition, the fastening on the guard plate would also still have to be changed due to said lower friction value of $0.05\mu$. An increase in the clamping force is, however, not easily possible since the transverse rigidity of the steel wire rope used is considerably higher than that of a fiber rope so that to the contrary the clamping forces with a fiber rope are considerably more critical and have to be limited to a comparatively greater degree.

It has already been proposed for this purpose in document WO 2012/100939 A1 to completely dispense with a rope clamping in order not to damage the high-strength fiber rope by transverse deformation. The rope end is admittedly held by means of clamp jaws on the guard plate outer side with a known wire steel rope end fastening, with said clamp jaws, however, not acting as clamping jaws, but only defining a guide passage for the fiber rope so that the latter can run beneath the jaws without transverse clamping. The rope end fastening in WO 2012/100939 A1 is achieved by a rope eye that is spliced into the rope end and that is hung at a rigid holding post at the guard plate outer side.

The problem of the transverse squeezing of the high-strength fiber rope is admittedly hereby alleviated. On the other hand, such a spliced end rope eye that can optionally be reinforced by a thimble is an obstacle on the retraction of the rope. To be able to thread the rope through reeving pulleys and rope pulleys, the rope has to have at least one smooth, non-spliced end. Leading through the guard plate of the hoist drum to arrive at the guard plate outer side from the drum jacket is also practically impossible with a spliced rope eye or an overdimensioned guard plate hole that would excessively weaken the guard plate would be necessary for this purpose if the rope end should not only be spliced after the threading through to said rope eye, which is hardly possible in practice.

It is therefore the underlying object of the present invention to provide an improved fiber rope drive and an improved hoist drum herefor that avoid the disadvantages of the prior art and further develop the latter in an advantageous manner. An improved rope end fastening of high-strength fiber ropes to the hoist drum should in particular be achieved that takes account of the special features of high-strength fiber ropes such as a low coefficient of friction, limited transverse pressure resistance and flexibility without impairing the threading in and out of the rope through rope pulleys at rope reevings and at the hoist drum.

In accordance with the invention, the named object is achieved by a hoist drum for a fiber rope drive having a drum jacket body for winding up fiber rope, having guide plates encompassing the drum jacket body, and having a rope end fastening apparatus for fastening a rope end to the hoist drum, wherein the rope end fastening apparatus has two strand guiding passages that are disposed next to one another and that lead to a rope deflection element at which the rope end is turned around and back so that a respective rope strand comes to lie in the rope guiding passages; and further comprising a clamping apparatus associated with the strand guiding passages for clamping at least the turned back rope strand in the strand guiding passage associated therewith; and by a fiber rope drive having the hoist drum and having a fiber rope comprising plastic fibers. Embodiments of the invention are the subject of the dependent claims.

It is therefore proposed to extend the rope distance available for the fastening of the rope end by a rope guide that moves to and fro and to considerably increase the holding effect by turning the rope around a rope turning element fastened to the hoist drum. In accordance with the invention, the rope end fastening apparatus of the hoist drum comprises two strand guiding passages that are disposed next to one another and that lead to a rope turning element at which the rope end can be turned around and back so that one respective rope strand comes to lie in the two strand guiding passages and furthermore comprises a clamping apparatus associated with the strand guiding passages for clamping at least that rope strand that is turned back around the rope turning element in the strand guiding passage associated with this rope strand. High rope holding forces can be generated and taken up at the rope turning element by the U-shaped turning of the rope around said rope turning element that results in a relatively sharp wrapping around of the rope turning element similar to a rope eye by the rope guiding passages disposed next to one another and by the clamping of the turned back rope end section in a similar manner to the case with a rope eye that is hung at a post, but without actually requiring a spliced rope eye. The forces to be taken up by the clamping are considerably reduced by the rope holding forces taken up at the rope deflection means so that it is possible to work with smaller clamping forces.

In an advantageous further development of the invention, said clamping apparatus cannot only be configured for clamping the turned back rope end section, but also for clamping the rope section running toward the rope turning element so that both the rope strand coming from the drum body and the turned back rope strand leading to the rope end can be clamped into said strand guiding passages disposed next to one another. The rope length to be clamped can hereby be considerably extended without significantly more construction space being required for this purpose. The rope strand running toward the rope turning element and the turned back rope strand that runs away can advantageously be clamped by common clamping jaws that can cover or engage around the two rope strands disposed next to one another and can clamp them together.

The rope contact contour of the clamping apparatus effecting the clamping can here advantageously be designed such that the rope strands disposed next to one another are both clamped or pressed with respect to one another and are clamped or pressed against a wall of the strand guiding passages at the hoist drum. The security against slipping through can be further increased by such a pressing against one another of the rope sections extending in opposite directions due to the turning. Since the rope portions pressed against one another are turned around said rope deflection element, the two rope portions would move in opposite senses to one another, i.e. in opposite directions, on any rope movement, for which purpose the sticking friction of the rope portions pressed toward one another would have to be overcome. This sticking friction is particularly helpful with fiber ropes since a microfit of the rope fibers can occur between the rope portions pressed toward one another that further increases the resistance to slipping through.

In order not only to clamp the rope sections running toward and away from the rope deflection element against the wall of the rope guiding passages, but also against one another, the rope guiding passages and the at least one clamping clasp—preferably a plurality of clamping clasps—extending thereover can define a common passage hole for both rope strands that is preferably pressed flat viewed in cross-section and that is in particular at least approximately oval. The strand guiding passages that are disposed next to one another and that lead to said rope turning element can in particular merge into one another or have a common tub-shaped passage base that is approximately U-shaped in cross-section and that can be centrally flat completely without any partition web or that can optionally centrally have a bump-like base increase clinging to the rope cross-sections. Alternatively or additionally, the rope contact contour of the clamping means associated with the strand guiding passages can have a common tub shape receiving both rope strands, in particular in the form of a clamping clasp top that is pressed flat in cross-section, that is at least approximately U-shaped and that can likewise centrally optionally have a light, bump-shaped contour elevation that clings to the rope contours.

To press the rope strands disposed next to one another sufficiently against one another, a width of said passage base and/or of said clamping claps top that corresponds to the extent between lateral bound flanks of the passage base and/or of the clamping clasp top transversely to the longitudinal rope direction can be smaller than, in particular slightly smaller than, or optionally also equal to twice the rope diameter of the non-clamped unloaded rope. Alternatively or additionally, a height of the rope passage opening that is defined between the passage base and the clamping clasp top can be smaller than or equal to the simple rope diameter of the non-clamped unloaded rope. The ratio of clamping against the hoist drum wall and clamping the rope strands against one another can be controlled by the interplay of height and width of the passage openings for the two rope strands. If, for example, said height of the passage opening is selected as smaller than the rope diameter, a pressing of the rope strands against the hoist drum wall and thus an accompanying cross-sectional deformation of the rope strands occur which then results in a pressing of the rope strands against one another with a passage width that corresponds to twice the rope diameter. Conversely, with a passage width that is slightly smaller than twice the rope diameter, a height corresponding to the rope diameter can be sufficient for a clamping since a cross-sectional deformation in the direction of said passage width occurs here that in turn results in a rope clamping in the vertical direction.

Alternatively to such a common rope strand clamping in which the rope strands are also clamped against one another, the rope strands that run toward and away from the rope deflection means can, however, also be individually clamped, with optionally separate clamping jaws also being able to be provided for every rope strand. This would in particular allow the clamping forces to be set separately for each rope strand. This can in particular be advantageous in connection with the configuration of the rope turning element, as will be explained below.

Said rope turning element about which the rope end to be fastened is turned back can generally be of different designs. In accordance with an advantageous embodiment of the invention, said rope turning element can comprise a post or a pin or a stump-shaped projection that can be rigidly or non-displaceably fastened to the hoist drum and forms a rigid deflection point for the rope end to be turned. The rope can be wrapped around said post or pin so that a corresponding wrap friction results in dependence on the warp angle.

Said turning pin is advantageously arranged in a region at which the two rope guiding passages disposed next to one another end or toward which they lead so that said turning pin is disposed in the pulling direction of the rope strands arranged in the rope guiding passages and the rope holding forces introduced by the pin or post substantially only hold the rope strands in the longitudinal direction of the rope guiding passages and do not attempt to pull them transversely out of the rope guiding passages.

Said fastening post can form a separate component that is rigidly fastened to the hoist drum, in particular to its guard plate. Alternatively, the fastening post can also be molded with material homogeneity to a structural part of the hoist drum in an integrally one-piece manner, in particular to the outer side of the guard plate.

Said fastening post can have a cross-section rounded at least at the pulling side, in particular approximately cylindrical, with a diameter of the fastening post at least being able to correspond to the rope diameter and preferably being able to lie in the range from 1.5 times to 5 times the rope diameter. A favorable compromise between a small type of construction and a bending of the fiber rope that is not too great can hereby be achieved.

The wrap angle of the fiber rope about said fastening post can preferably be in the range from approximately 180° and in particular from 170° to 200°. Optionally, however, a 1½ loop, that is a wrap angle of approximately 540°, can be provided, whereby the holding forces at the fastening post can be considerably increased. In the sense of a uniform distribution of the holding forces also over the clamping jaws, however, only a half loop, i.e. a wrap angle of approximately 180°, can be advantageous.

Alternatively or additionally to such a fixed deflection post, said rope turning element itself can also be configured as clamping so that the fiber rope is also clamped to the rope turning element itself.

For this purpose, for example, an adjustable clamping disk, in particular a clamping disk that can be pulled or pressed down in the longitudinal post direction, can be provided at said fastening post by means of which the rope guided around the post is clampable against the hoist drum wall.

In an advantageous further development of the invention, the clamping at the rope turning element can also be achieved in that the rope turning element is formed in the manner of a rope clamp lock. Such a rope clamp lock can advantageously comprise a movably or displaceably supported rope deflection block that is displaceably arranged in a tapering rope guide such that the rope pull draws the deflection block and thus the rope into the clamping contour. Said deflection block and/or the guide contour receiving the deflection block can advantageously be of wedge shape and/or of funnel shape and/or can be contoured in a tapering manner in the direction of the rope running off the deflection block.

In an advantageous further development of the invention, said deflection block and/or the rope guiding contour encompassing the deflection block can have a taper in the region of a wedge angle of 2×3° to 2×20°, preferably 2×5° to 2×10°. A high clamping friction can hereby be achieved without too high a squeezing of the fiber rope.

The turning block and the rope guiding contours surrounding the turning block can advantageously be matched to one another over a length that corresponds to at least twice, preferably five times or more of the rope diameter. Squeezing of the fiber rope by too much can be avoided by such a relatively long length of the clamping contour pairing.

In a further development of the invention, the fiber rope can loop around said deflection block that acts as a clamping wedge at a wrap angle of approximately 180°, preferably 180° to 220°, so that the fiber rope can be clamped at oppositely disposed sides of the deflection block against rope guiding contours provided there and in so doing the rope pull simultaneously pulls the deflection block into the rope guiding contour tapering in funnel form.

In an advantageous further development, said rope clamping lock, at least including said deflection block and the rope guiding contours encompassing it, can form a separate pre-assembled installation that can subsequently be fastened to the hoist drum, in particular to its guard plate, with this pre-assembled installation advantageously also being able to comprise the rope guiding passages running to the rope clamping lock and/or the clamping jaws associated with the rope guiding passages so that the total rope end fastening apparatus can be installed or retrofitted to the hoisting drum, in particular to the guard plate, in the form of a pre-assembled installation. It would, however, alternatively likewise be possible to form said components of the rope clamping lock and/or the clamping jaws separately from one another and to install them separately.

To support the clamping effect of said rope clamping lock, it can be advantageous to clamp the rope strand leading toward the rope lock and the rope strand leading away from the rope lock with different strengths, with the turned rope section that leads to the rope end in particular being able to be clamped with a greater strength than the rope strand coming from the drum body. It is ensured by such a clamping of the rope strands leading toward and away with different strengths that the rope clamping lock can develop its full effect and the rope holding effect of the rope clamping lock is taken into account in the sense of a uniform distribution of the holding forces over the clamping jaws.

For example, the rope strand that runs toward the rope clamping lock and that comes from the drum body cannot be clamped at all or can only be lightly clamped so that the clamping jaws spanning this strand essentially only act in the manner of a rope guide. In this case, only the turned back rope section is clamped and held by corresponding clamping jaws.

Alternatively, however, both rope strands, i.e. the rope strand coming from the drum body and running toward the rope clamping lock and the turned back rope strand can also be clamped when a rope clamping lock is formed, with the clamping apparatus advantageously being able to be configured such that the clamping effect at the turned back rope strand is greater than the clamping effect at the rope strand running toward the rope lock. Such a different setting of the clamping forces can be achieved, for example, by a variable setting of the torque with which the clamping screws tightening the clamping jaws are tightened. Alternatively or additionally, clamping jaws can also be provided that are tightened to a stop or to an abutment and thus always adopt the same clamping position, but have a different dimensioning with respect to the passage hole for the rope strands defined by the clamping jaws. The clamping contour associated with the turned rope strand can in particular define a smaller rope passage cross-section than the clamping contour that is associated with the rope strand that runs toward the rope lock and comes from the drum body. A height of the rope contact section of the clamping jaw that is associated with the rope strand running toward the rope lock can, for example, be larger than the height of the clamping jaw rope contact section that is associated with the turned rope strand so that the rope strands are pressed against the hoist drum wall with different strengths.

Said clamping of the rope strands with different strengths can in particular be of advantage in conjunction with said drum lock, but can generally also be used in the previously explained embodiment with a rigid deflection post. The clamping with different strengths can also be combined with the previously described embodiment in which the rope strands are not only pressed and clamped against a hoist drum wall, but are also pressed against one another.

BRIEF DESCRIPTION OF THE FIGURES

The invention will be explained in more detail in the following with reference to advantageous embodiments and to associated drawings.

DETAILED DESCRIPTION

Figure 1:
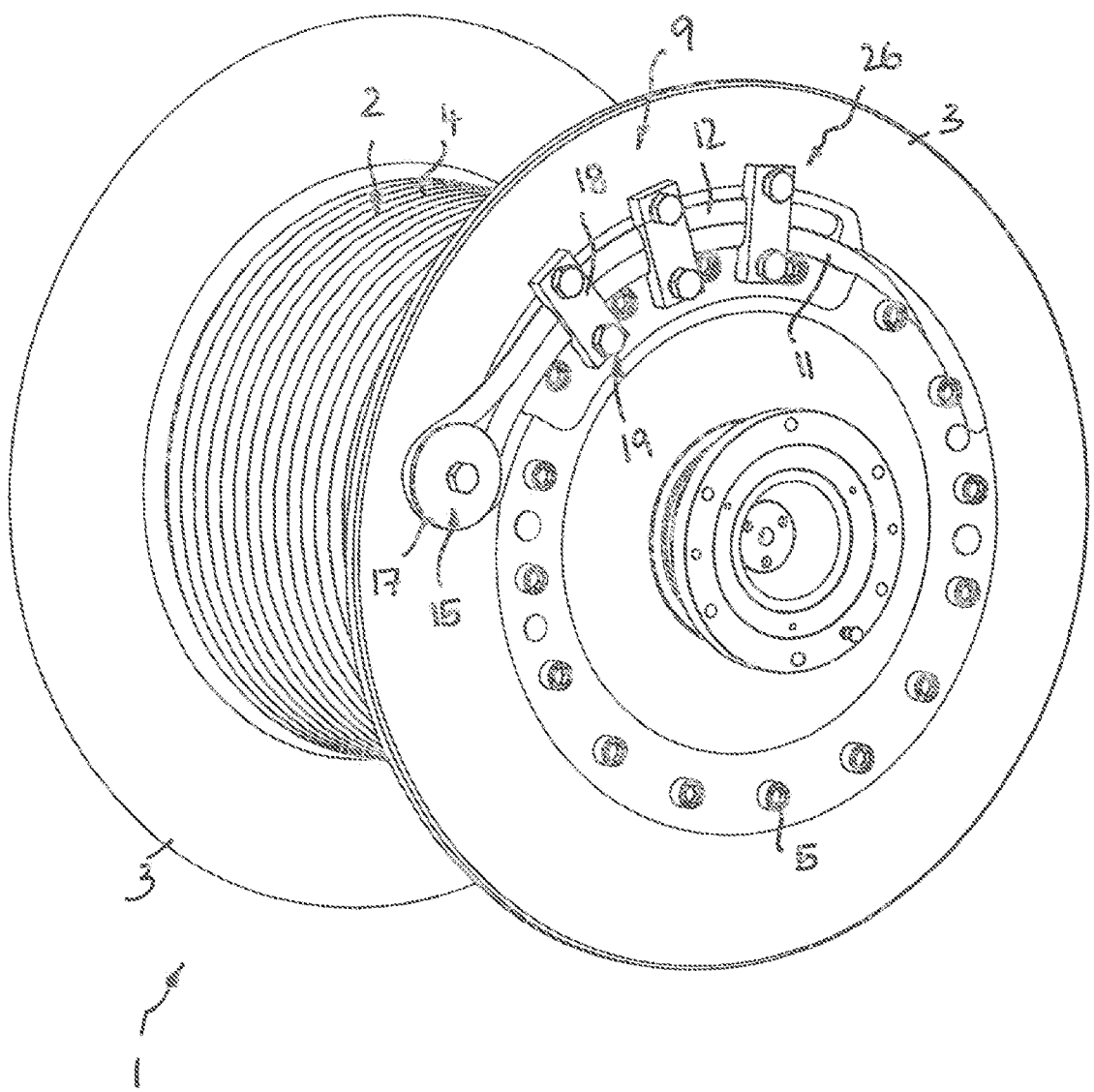
FIG. 1 shows a perspective representation of a hoist drum of a fiber rope drive in accordance with an advantageous embodiment of the invention, with the rope fastening apparatus at the outer side of a guard plate and the fiber rope fastened thereto being shown.

The hoist drums 1 shown in the Figures each comprise an, in rough terms, cylindrical drum jacket body 2 to whose axial ends respective guard plates 3 are connected which, in rough terms, extend perpendicular to the longitudinal drum axis and project radially outwardly from the drum jacket surface and have a much larger diameter than the drum jacket.

The hoist drum 1 shown can in this respect in particular be used in the hoisting gear of a crane such as a revolving tower crane or a mobile telescopic crane or a boom mast adjustment gear, but also in other hoist winches.

Said guard plates 3 can be connected in different manners to the drum jacket body 2. For example, a single-piece production is conceivable, with advantageously, however, the guard plates 3 being able to be subsequently joined to the drum jacket body 2. As FIG. 1, for example, shows, the guard plates 3 can be placed onto the drum jacket body 2 at the front side and can be fastened by fastening means in the form of bolts 5.

The drum jacket body 2 can be provided with grooving 4 whose rope grooves 6 can extend over the total drum jacket body 2.

Figure 3:
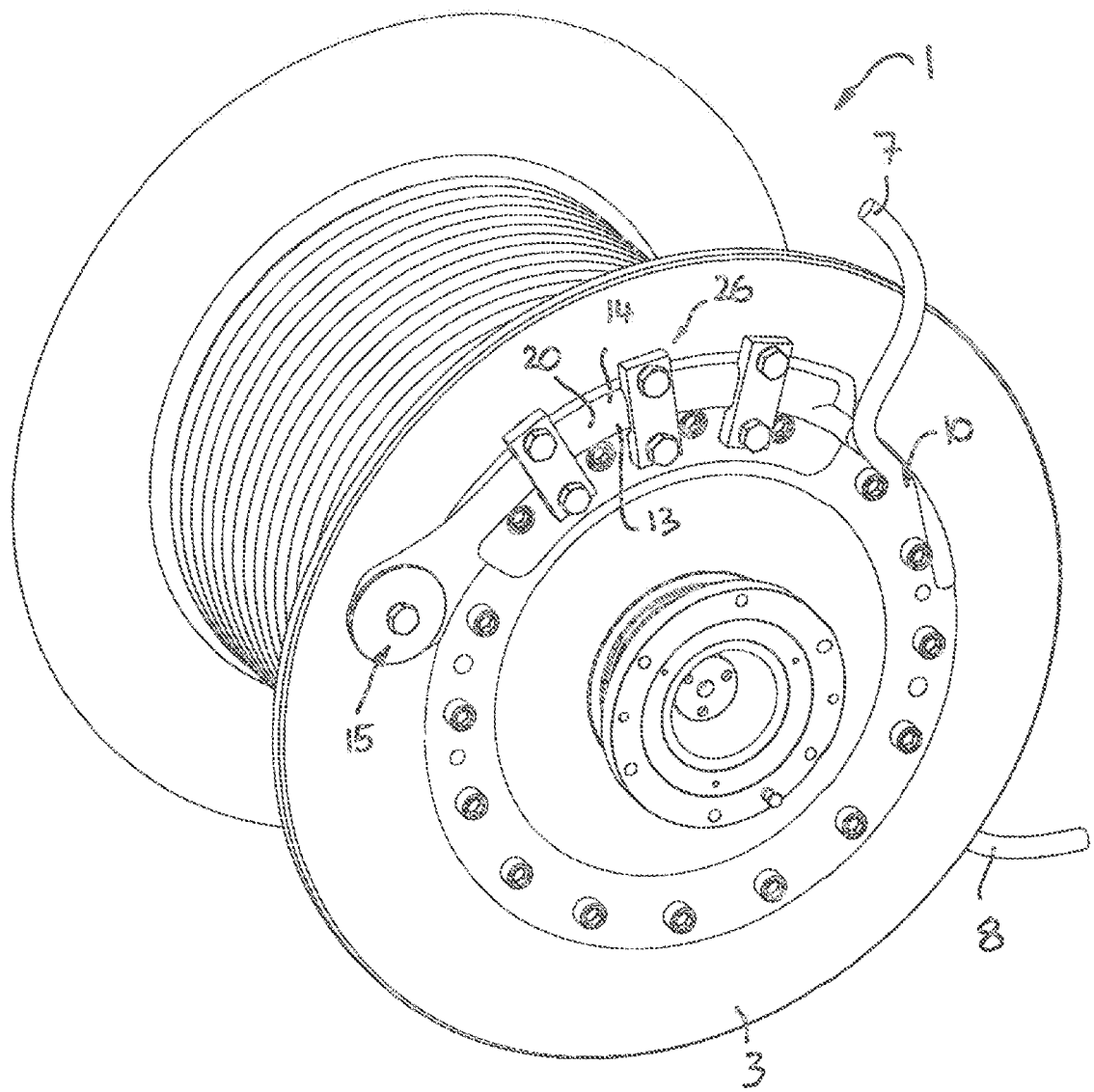
FIG. 3 shows a schematic, perspective representation of the hoist drum of the preceding Figures that shows the threading of the fiber rope through the guard plate.
Figure 4:
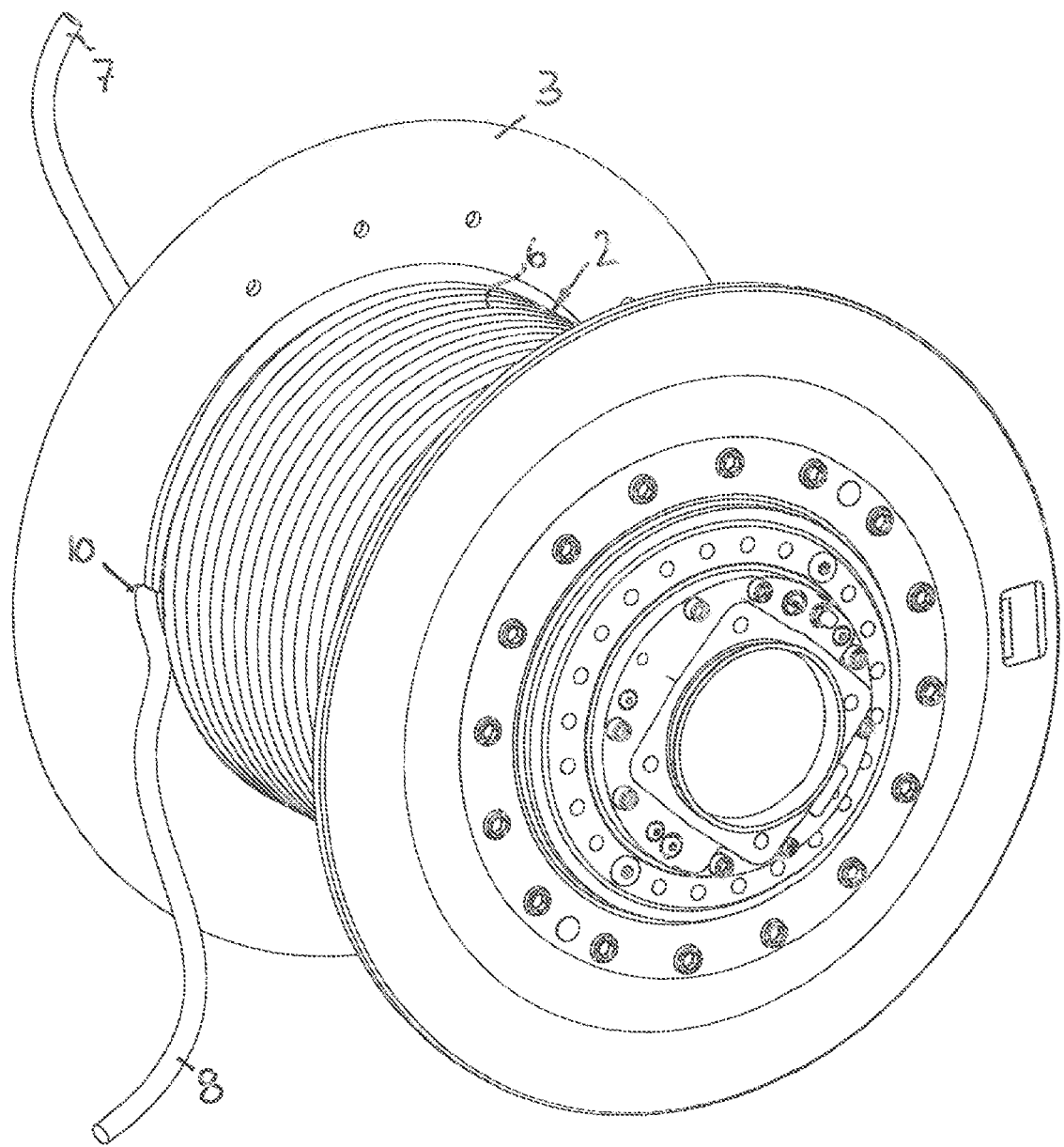
FIG. 4 shows a perspective, schematic representation of the hoist drum of the preceding Figures that shows the threading of the rope through the guard plate from the drum side.

To fasten the rope end 7 of the rope 8 to be wound onto the drum jacket body 2 to the hoist drum 1, the rope end 7 of the rope 8 can be led through the guard plate 3 onto an outer side of one of the guard plates 3 and can be fastened there by means of a rope fastening apparatus 9. As FIGS. 3 and 4 show, the guard plate 3 can have a rope leadthrough 10 in the form of a cut-out in the guard plate 3, in particular in the form of a passage hole, in a section adjacent to the drum jacket body 2.

The rope fastening apparatus 9 that is provided and fastened at the outer side of the guard plate 3 can form a pre-assembled installation separate from the guard plate 3 and can be installed as a whole onto the guard plate outer side. Alternatively, the components of the rope fastening apparatus 9 still to be described can, however, also be installed separately at the guard plate 3.

Figure 5:
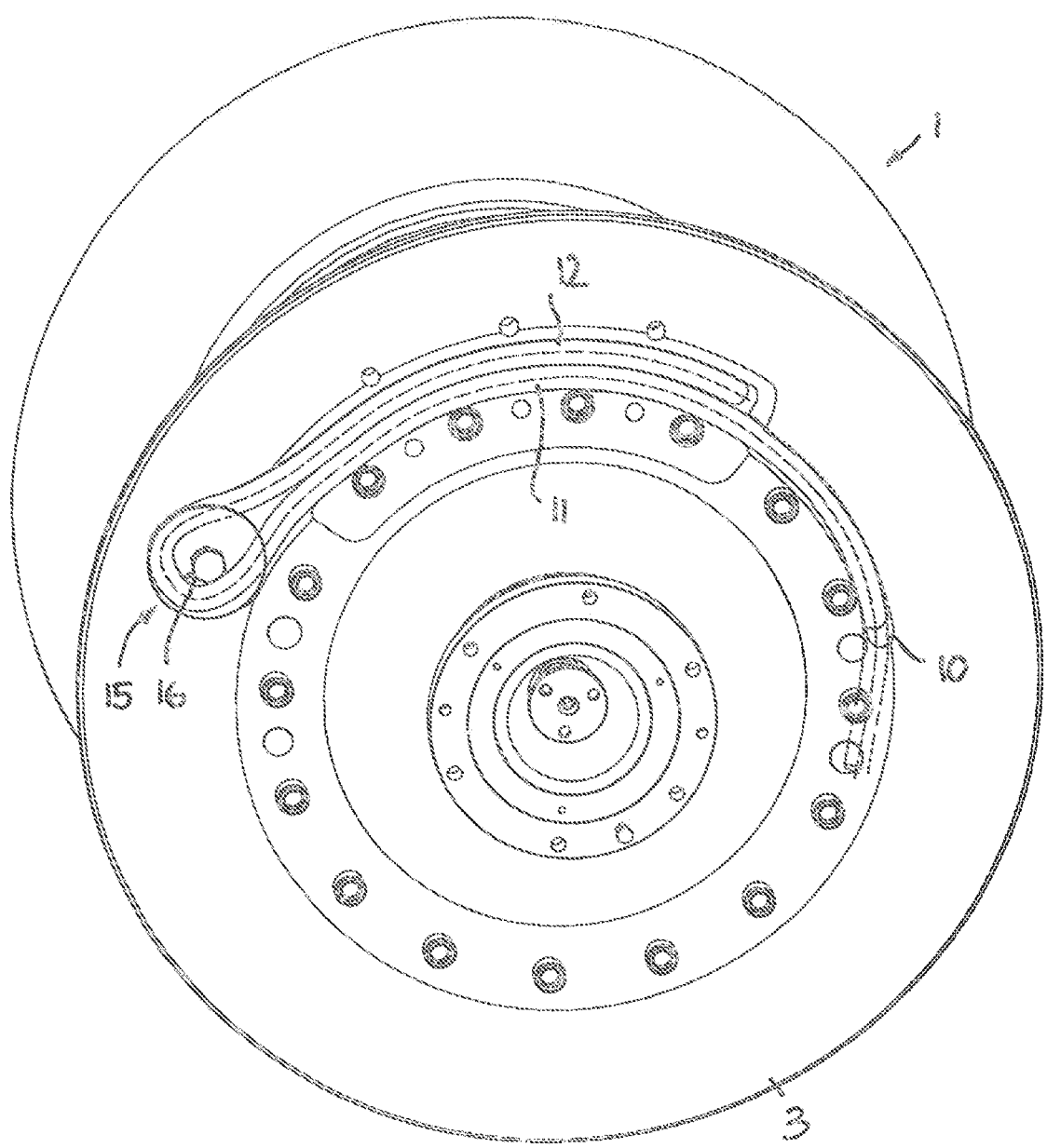
FIG. 5 shows a schematic, perspective representation of the hoist drum of the preceding Figures that shows the fiber rope after the introduction into the rope guiding passages and turned back around the deflection post with still removed clamping jaws.
Figure 6:
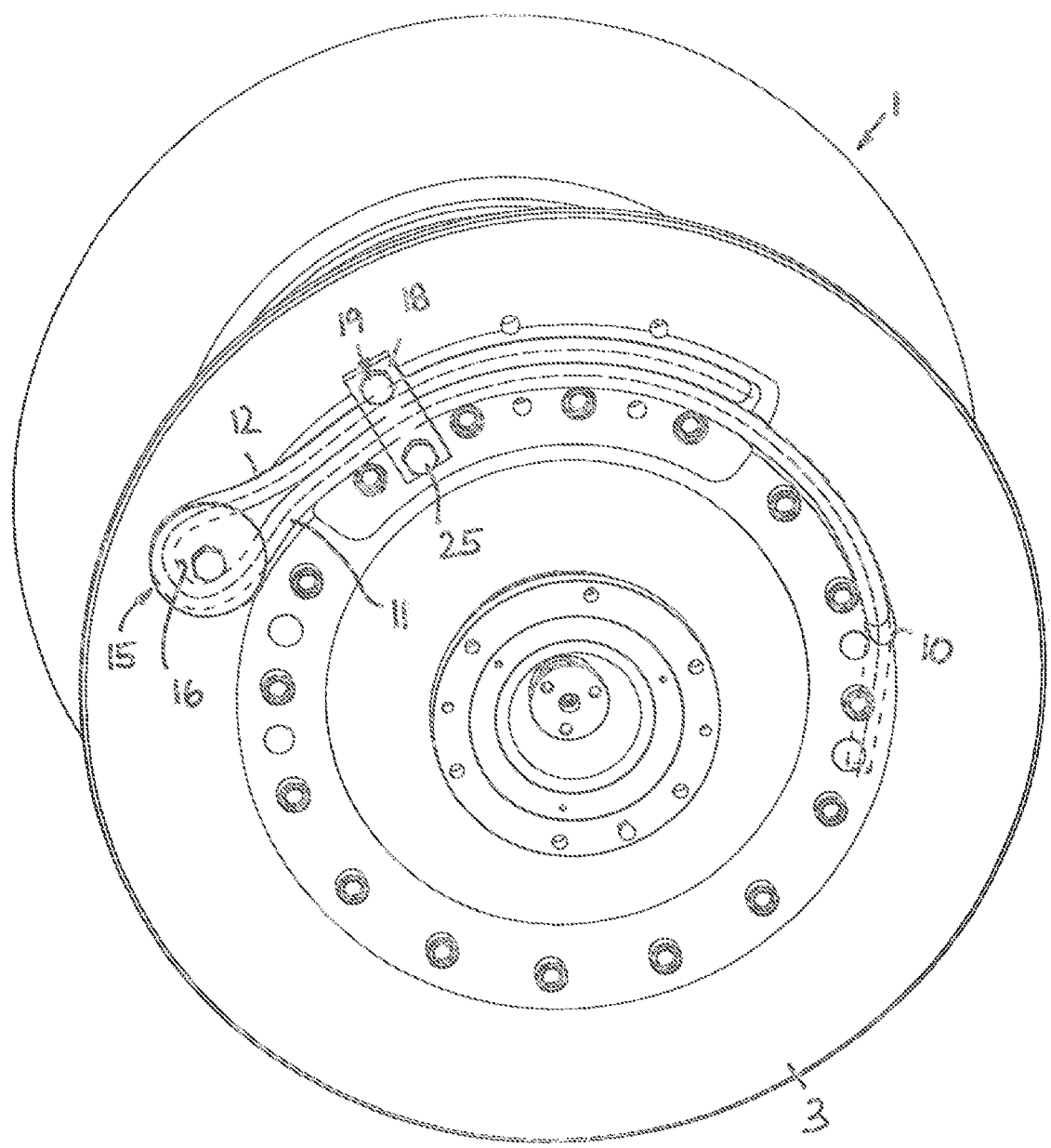
FIG. 6 shows a schematic, perspective representation of the hoist drum of the preceding Figures that shows the rope fastening apparatus after the attachment of a first clamping jaw.

As FIGS. 1 and 3-5 show, the rope fastening apparatus 9 is configured such that the rope 8 can be clamped tight to the outer side of the guard plate 3 without a spliced rope eye and also without a pressed on rope thickening end or other rope changes, with the rope fastening apparatus 9 providing a turning back or turning around of the rope end 7 so that two rope strands 11 and 12 that are formed by different sections of the rope 8 come to lie next to one another, cf. FIG. 5.

The rope fastening apparatus 9 for this purpose comprises two rope guiding passages 13, 14 that are disposed next to one another, that extend next to one another away from the aforesaid rope leadthrough 10 in arcuate form about the axis of rotation of the hoist drum 1 and that lead to a rope deflection element 15 of the rope fastening apparatus 9 about which the rope 8 can be turned.

Figure 2:
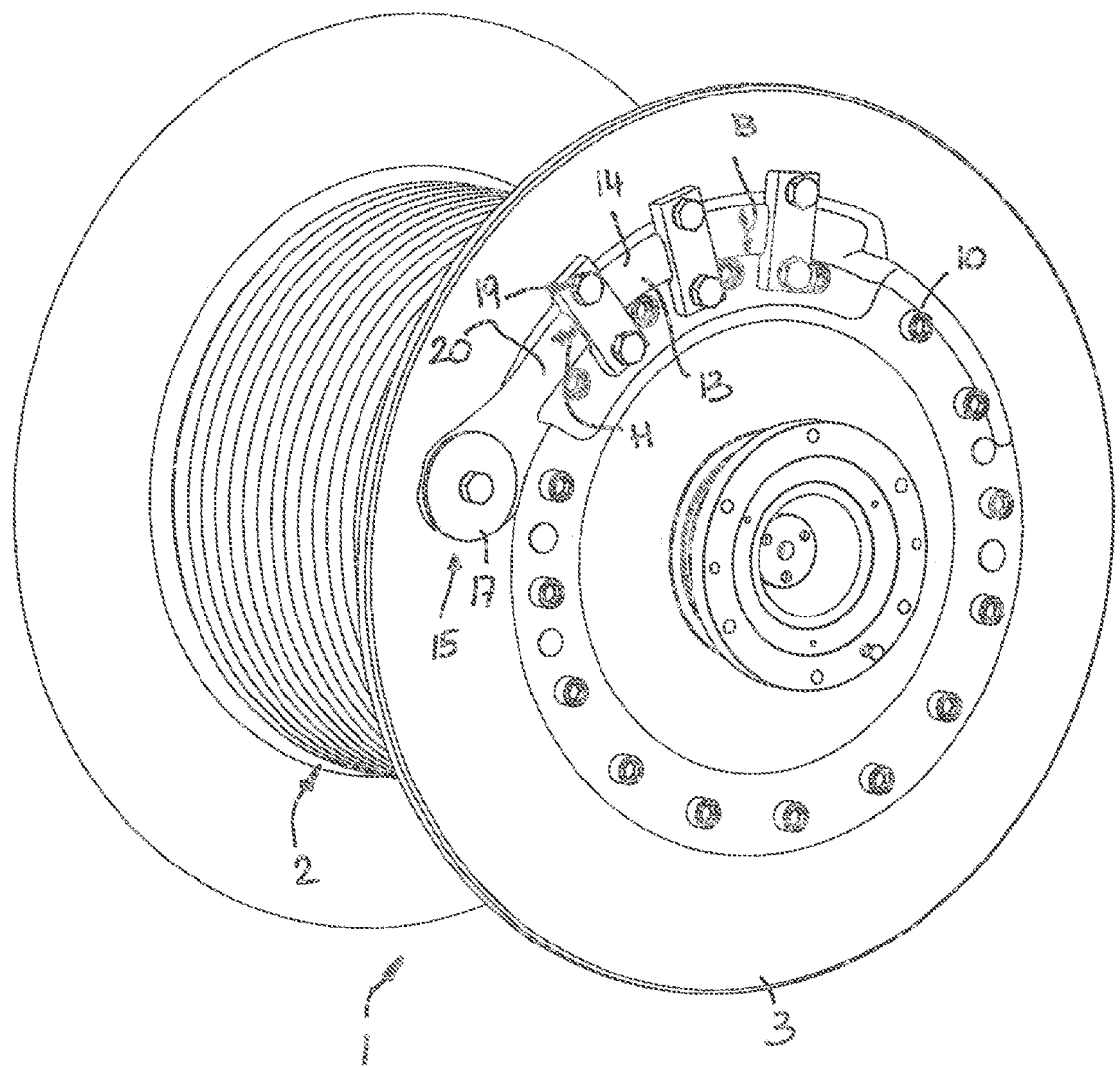
FIG. 2 shows a schematic, perspective side view of the hoist drum of FIG. 1, with the rope fastening apparatus being shown without a rope so that the rope guiding passages can be seen that merge into one another in this embodiment to be able also to press the rope strands against one another.

Said rope guiding passages 13 and 14 can merge into one another and/or can be formed by a common tub-shaped collection passage in which both rope strands 11 and 12 can be received, cf. FIG. 2. Alternatively, the rope guiding passages 13 and 14 can also be arranged separately and/or spaced apart from one another, but preferably extending substantially in parallel with one another, cf. FIG. 9.

Independently of a common formation merging into one another or of a separate formation, said rope guiding passages 13 and 14 can be formed directly in the guide plate 3 or can also be formed in a support plate that can be installed on the guard plate 3 and can form the support plate of the previously named pre-assembled installation. Said rope guiding passages 13 and 14 can here be formed in the shape of a groove-like depression whose depth is preferably smaller than the rope diameter, for example also less than half the rope diameter—with a non-deformed, unloaded rope, cf. FIG. 11 that shows the tub depth of the rope guiding passages 13 and 14 with separate rope guiding passages 13 and 14, but also applies accordingly to a common collection passage.

As FIGS. 1 and 2 show, the rope guiding passages 13 and 14 extending in arcuate form around the hoist drum axis run from the rope leadthrough 10 onto said rope deflection element 15 that can be rigidly attached to the guide plate 3 spaced sufficiently far from the rope leadthrough 10, for example spaced apart by an angle of approximately $\pi/4$ from the rope leadthrough 10. The spacing from the rope leadthrough 10 can, however, also be differently dimensioned depending on the required rope clamping length.

Figure 7:
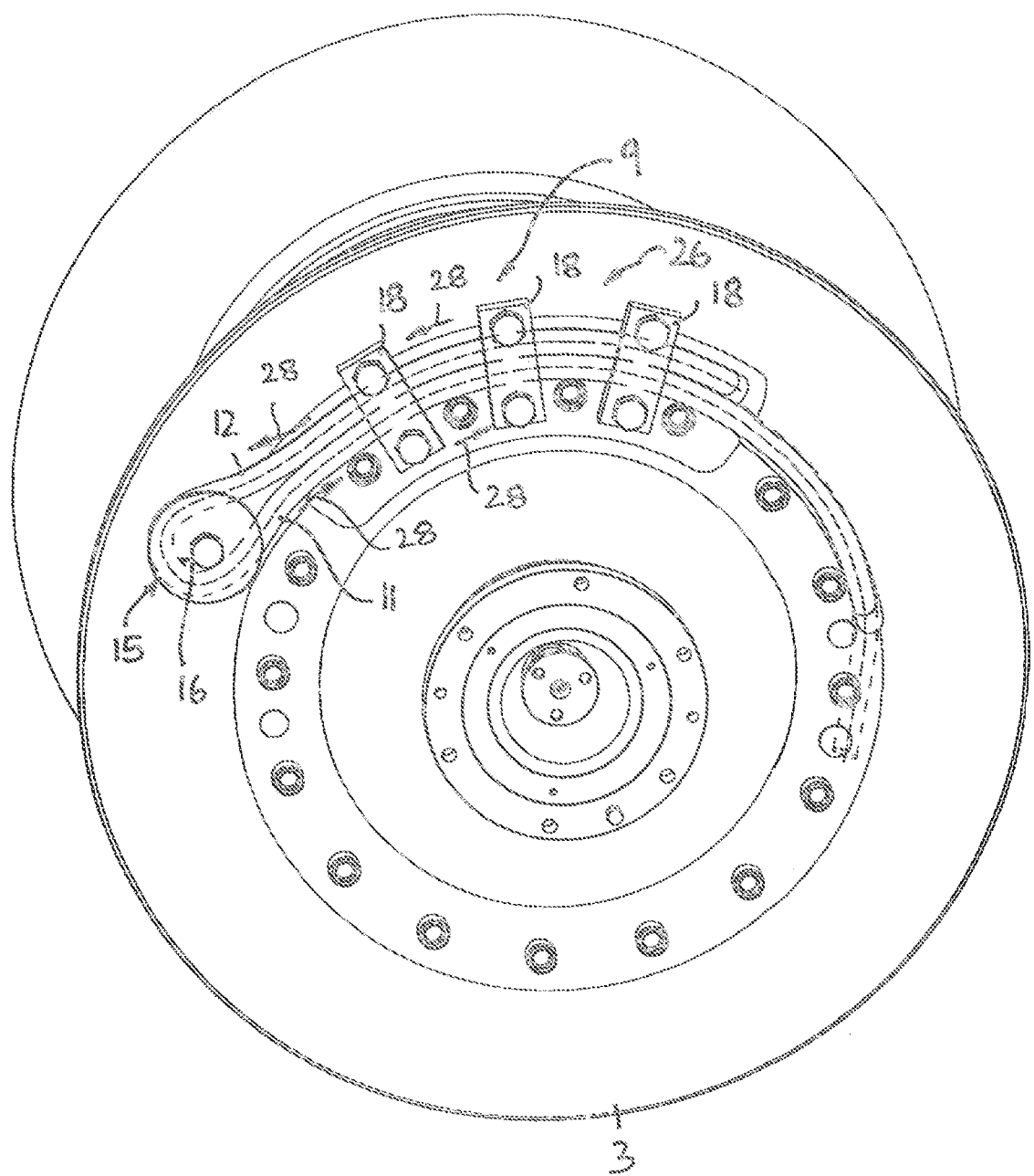
FIG. 7 shows a schematic, perspective representation of the hoist drum of the preceding Figures that shows the rope fastening apparatus after the attachment of three clamping jaws.
Figure 8:
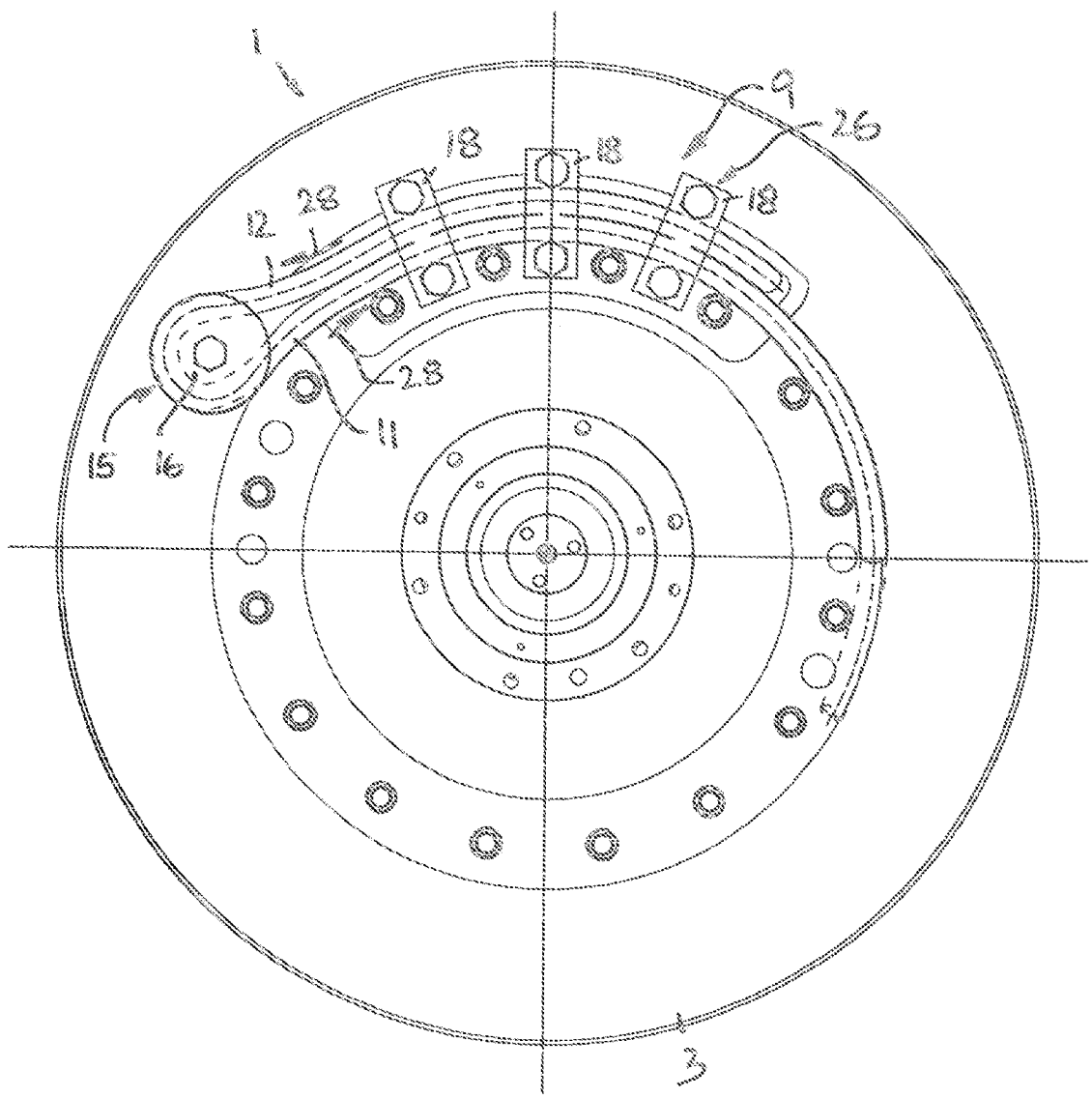
FIG. 8 shows a frontal plan view of the outer side of the guard plate of the hoist drum and the rope fastening apparatus fastened thereto in the fully assembled state similar to FIG. 7.

Said rope deflection element 15 can, as FIGS. 1 to 8 show, be a rigid deflection post 16 that can have a collar 17 spaced apart from the guard plate 3 to prevent an unwanted slipping down from the deflection post 16. As FIG. 8 shows, the deflection post 16 can have an at least rounded cross-section and can in particular be formed as approximately cylindrical and can here have a diameter that can be in the range of one to five times, in particular approximately two times, the rope diameter.

The collar 17 fastened to the rigid deflection post 16 can be spaced apart from the guard plate 3 by different amounts and/or can be fastened at positions spaced differently far apart to be able to adapt the rope deflection element 15 to different rope diameters, in particular also to be able to achieve a certain clamping effect. For example, the collar 17 can be drawn onto the deflection post 16 by means of a screw connection to be able to optionally clamp the rope 8 disposed between the collar 17 and the guard plate 3 in addition to the clamping jaws 18.

To be able to fix the turned rope 8, the rope fastening apparatus 9 has at least one clamping jaw 18, but preferably a plurality of such clamping jaws 18 that can be attached spaced apart from one another along the extent of the rope guiding passages 13 and 14.

Said clamping jaws 18 can be tensioned toward the guard plate 3 by tensioning means 19, for example in the form of bolts 25, to be able to clamp the rope strands 11 and 12 running through beneath the clamping jaws 18.

As FIG. 1 shows, the clamping jaws 18 here advantageously extend over both rope strands 11 and 12 and can be configured such that the rope strands 11 and 12 cannot only be pressed against the guard plate 3 or against a support plate of the rope fastening apparatus attached to the guard plate 3, but also against one another. This pressing against one another of the two rope strands 11 and 12 can also be supported and/or achieved by a corresponding configuration of the rope guiding passages 13 and 14 in the wall disposed opposite the clamping jaws 18. The rope guiding passages 13 and 14 can in particular merge into one another without a boundary and can have a common tub-shaped passage base which is approximately U-shaped in cross-section and on which both rope strands 11 and 12 can be received disposed next to one another. Adapted to this tub-shaped passage base 20, the clamping jaws 18 can likewise advantageously have a common, tub-shaped clamping jaw top that is approximately U-shaped in cross-section and that extends over said passage base 20 so that the rope contact contours effecting the rope clamping define, viewed in total, rope passage holes which are pressed flat, in particular approximately oval in cross-section, and in which the two rope strands 11 and 12 disposed next to one another can be pressed between the clamping jaws 18 and the walls of the rope guiding passages 13 and 14, on the one hand, and also against one another, on the other hand.

For this purpose, the width B of said tub-shaped passage base 20 and/or of the tub-shaped clamping jaw top between lateral boundary flanks of the passage base and/or of the clamping clasp top can be smaller than or equal to twice the rope diameter in the non-clamped, unloaded rope state, with a height H of said rope leadthrough passages between the passage base 20 and the clamping jaws 18 being able to be smaller than or equal to the rope diameter in the non-clamped, unloaded state.

An additional security against slipping through can be achieved by the clamping against one another of the two rope strands 11 and 12 since the rope 8 is turned around the deflection post 16 and the rope strands 11 and 12 would have to move in opposite senses to one another on any movement of the rope 8 as the arrows 28 show, cf. FIGS. 7 and 8.

The number of clamping jaws 18 can be varied. The rope strands 11 and 12 can in particular be clamped to the guide plate 3 by a variable number of clamping jaws 18 depending on the magnitude of the occurring rope pull and on the number of safety windings on the drum jacket body 2 so that they form a compact unit to take up the tensile force that occurs with sufficient security by the deflection post 16 and the clamping jaws 18.

Figure 9:
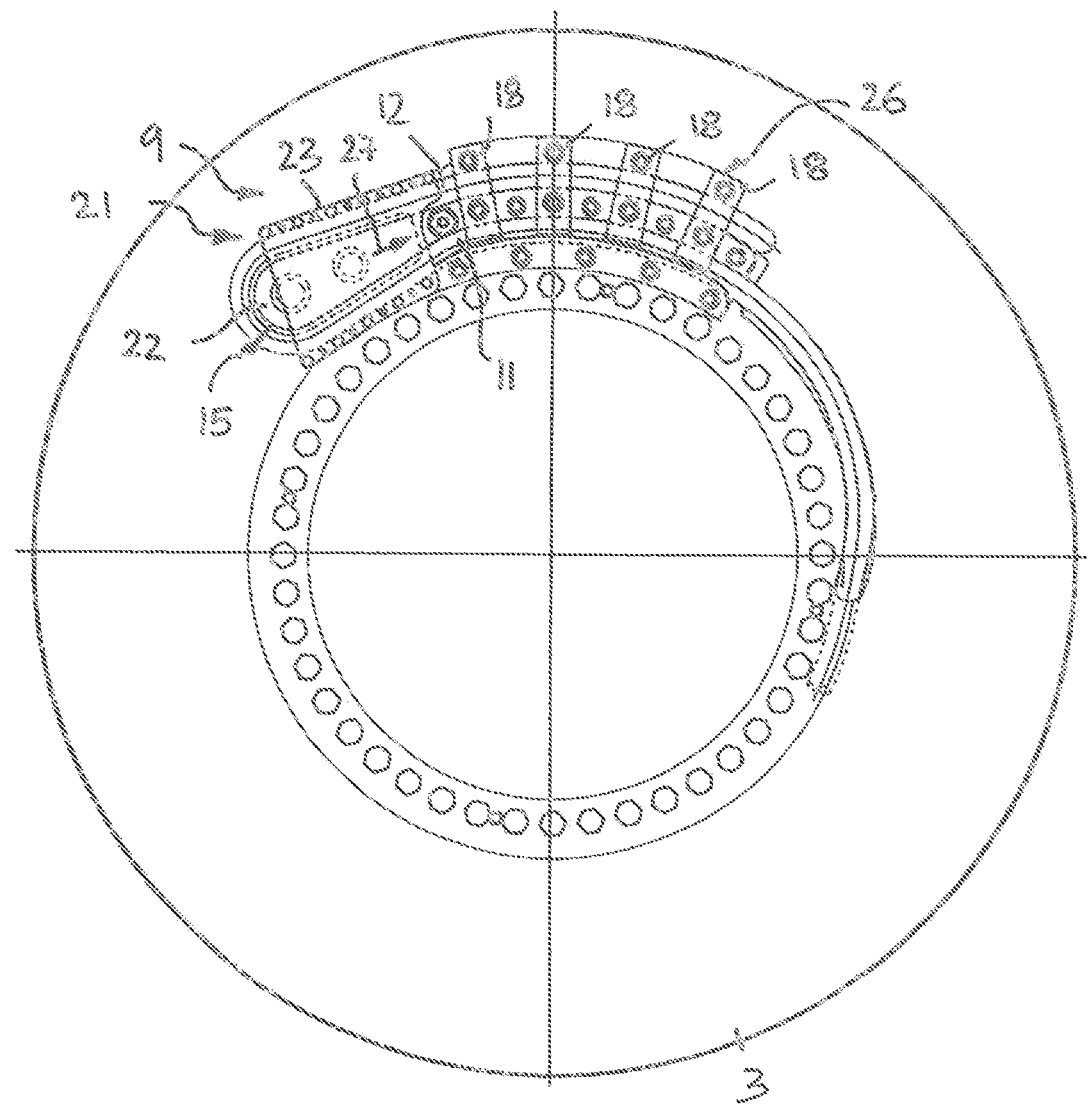
FIG. 9 shows a frontal plan view of the outer side of the guard plate of a hoist drum of a fiber rope drive in accordance with a further embodiment of the invention, with the rope fastening apparatus comprising, instead of the rigid deflection post shown in the preceding Figures, a rope clamping lock in which the turned back fiber rope is clamped in addition to the clamping jaws.
Figure 10:
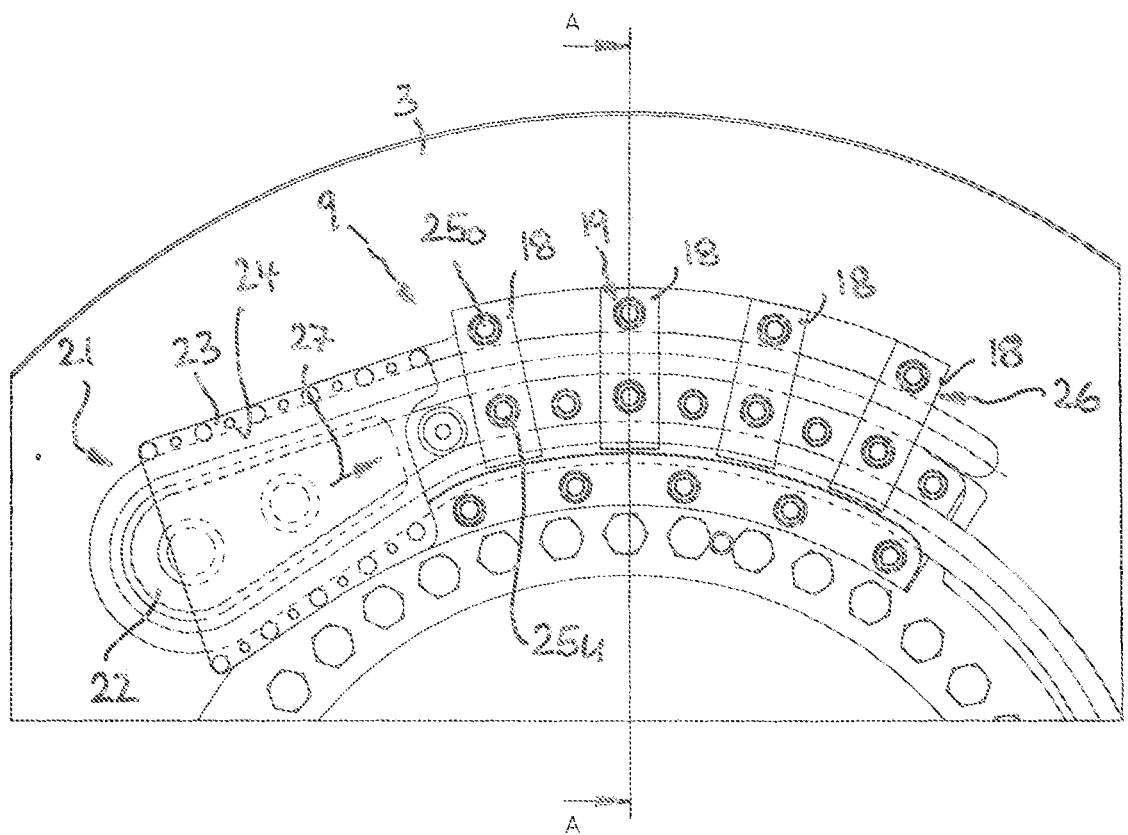
FIG. 10 shows a sectional, enlarged frontal view of the rope fastening apparatus and its rope clamping lock of FIG. 9.

Instead of said deflection post 16 rigidly arranged at the guard plate 3, a rope clamping lock 21 can also be provided that clamps itself by the rope pull and in so doing clamps the rope 8 tight. As FIGS. 9 and 10 show, such a rope clamping lock 21 can likewise be arranged at the end of the two rope guiding passages 13 and 14 disposed next to one another so that the rope that comes from the rope leadthrough 10 and that runs toward the rope clamping lock 21 in the rope guiding passage 13 can be turned around said rope clamping lock 21 so that the turned back rope strand 12 runs in the other rope guiding passage 14. If not explicitly differently explained, the hoist drum 1 and also the rope fastening apparatus 9 can in another respect be configured as explained with respect to the preceding Figures, with corresponding reference numerals also being used for corresponding components.

Said rope clamping lock 21 comprises a movably supported deflection block 22 which is in particular displaceable in the rope pull direction and about which the rope 8 is turned in the previously named manner. Said deflection block 22 is here arranged in a clamping block 23 that is arranged in a fixed position at the guard plate 3 and that has rope clamping contours 24 surrounding the deflection block 22. Said rope clamping contours 24 can, for example, be formed by flange-like contact webs that project to the front from the guard plate 3 and/or that laterally surround said deflection block 22. A gap-shaped rope passage through which the turned back rope 8 extends can in particular be formed between the deflection block 22 and said rope clamping contours 24 of the clamping block 23.

Said rope clamping contours 24 and the outer contours of the deflection block 22 adapted thereto can advantageously taper, and can in particular be wedge-shaped and/or funnel-shaped, in the rope pull direction 27—that is toward the clamping jaws 18.

The rope clamping contours 24 and the deflection block 23 are in particular configured and matched to one another such that the gap-shaped rope passage between the deflection block 22 and the clamping block 23 narrows when the deflection block 22 is drawn into the clamping block 23 and/or is drawn onto the clamping block 23 under the rope pull of the rope 8. To achieve a sufficient rope clamping force without having excessive rope squeezing forces, the rope clamping contours 24 of the clamping block 23 and/or the clamping contours of the deflection block 22 can taper at a wedge angle of approximately 2×5° to 2×15°. The cooperating rope clamping contours 24 and the clamping contours of the deflection block 22 can advantageously have a rope clamping length along which the deflection block 22 and the clamping block 23 can clamp the turned rope 8, said rope clamping length at least corresponding to twice the diameter of the non-deformed rope 8, preferably also more than three times the rope diameter, and in particular also being able to correspond to more than five times the rope diameter.

The front side of the deflection block 22 remote from the clamping jaws 18 is advantageously rounded to lead the rope 8 in arcuate from around the deflection block 22.

To combine a simple handling with a reliable rope securing, said clamping block 23 can have a receiving pocket in which the deflection block 22 is at least partially received and in which said deflection block 22 can be axially displaced. The deflection block 22 can, for example, be arranged captively, but longitudinally displaceably in the rope pull direction, in said receiving pocket of the clamping block 22 by means of an elongate hole guide.

To reinforce the function of the rope clamping lock 21, the clamping jaws 18 can be set and/or configured such that the rope strand 11 running onto the rope clamping lock 21 from the rope leadthrough 10 is clamped less strongly than the turned back rope strand 12. An automatic retensioning of the rope clamping lock 21 and hereby a higher clamping effect of the rope clamping lock 21 hereby takes place on an occurring rope movement in the rope pull extent.

The adjustability of a smaller rope clamping effect for the in-running rope strand 11 can be implemented, for example, in that the clamping jaws 18 are preloaded with a smaller preload force in the region of said rope strand 11, for example by tightening the associated bolts 25—in FIG. 10 the lower bolts 25u—with a smaller tightening torque than is the case on the tightening of the bolts 25o that are associated with the other rope strand 12. In this respect, work can be carried out with separate clamping jaws for each of said rope strands 11 and 12; alternatively, however, clamping jaws 18 can also still be used that extend over both rope strands 11 and 12.

Figure 11:
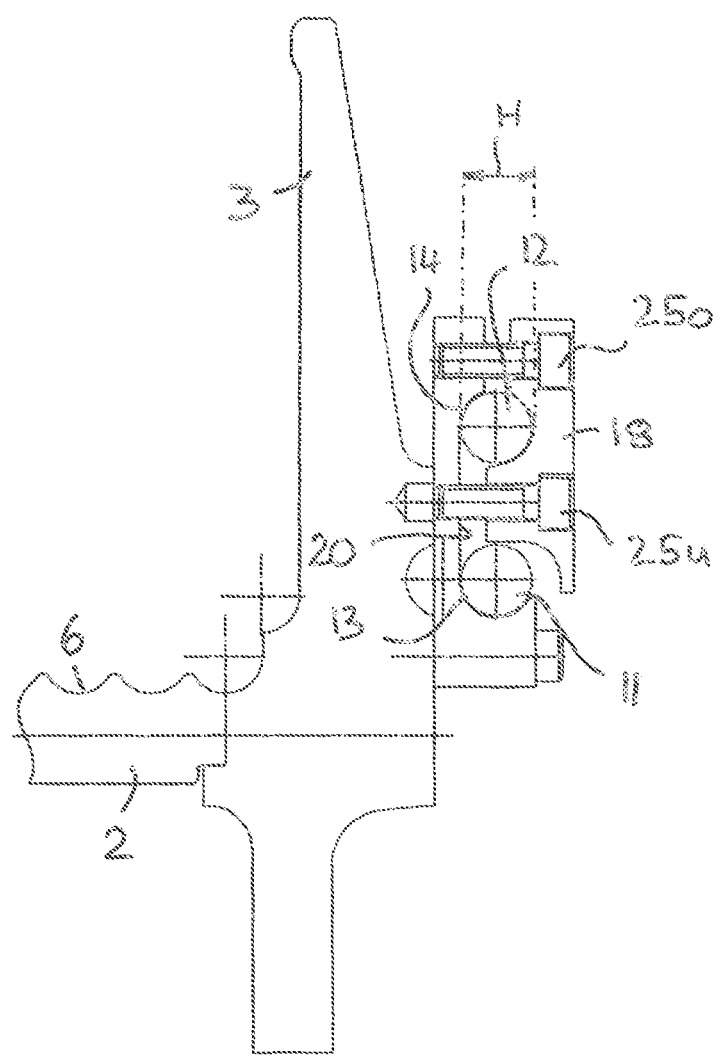
FIG. 11 shows a sectional view through one of the clamping jaws along the line A-A in FIG. 10 that shows the different contours of the rope contact sections of the clamping jaw to achieve clamping forces of different levels for the different rope strands.
Figure 12:
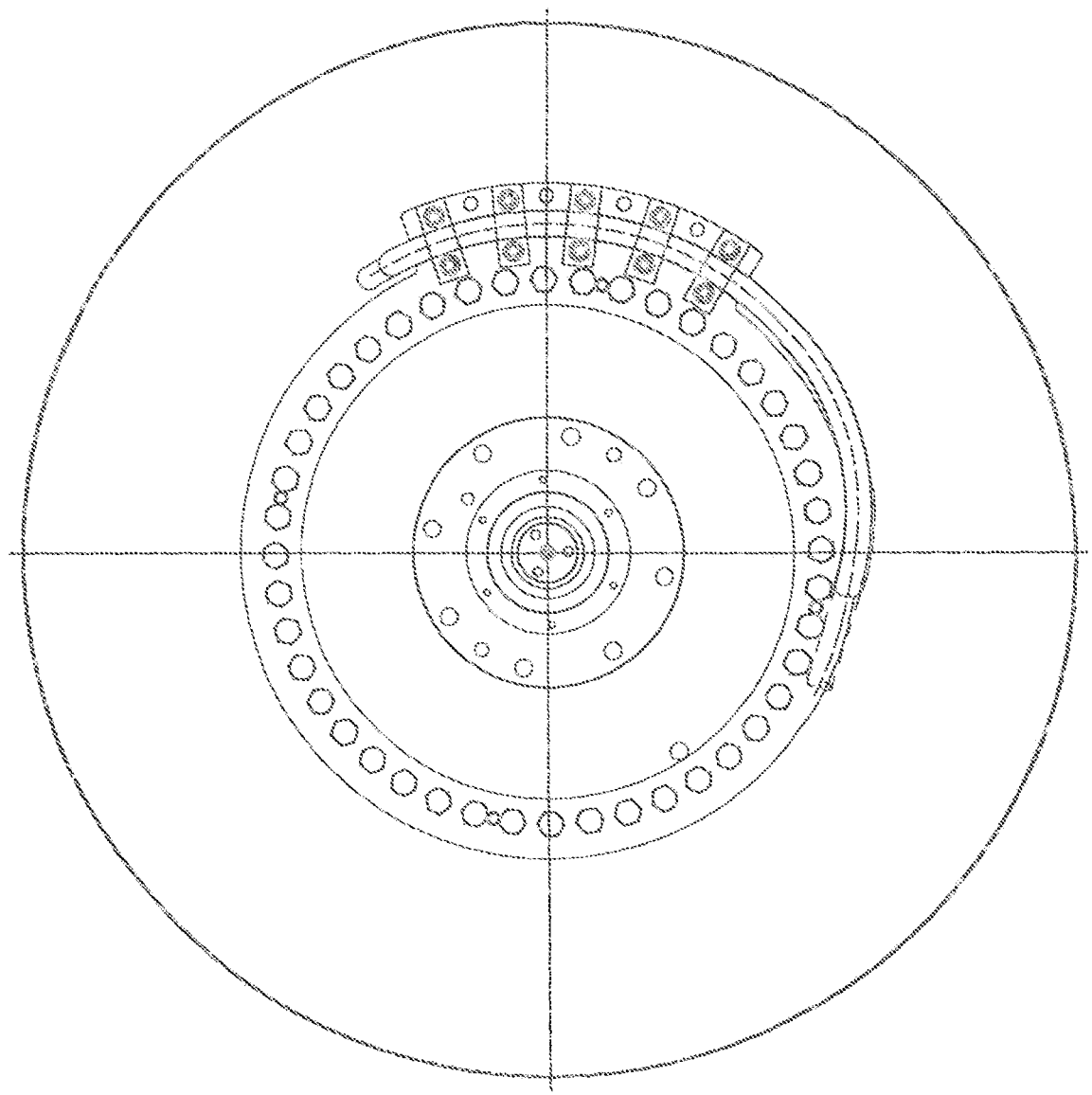
FIG. 12 shows a frontal plan view of the outer side of the guard plate of a hoist drum in accordance with the prior art that shows the conventional rope fastening for steel wire ropes.

Alternatively or additionally to the setting of different preload forces, the clamping jaws 18 can, however, also be differently contoured for the two rope strands 11 and 12 to have different clamping effects in said rope strands 11 and 12. The clamping jaws 18 can in particular be tightened until contact so that they only have said different clamping effects due to different contouring of the jaw sections associated with the different rope strands 11 and 12. FIG. 11 shows this by way of example, according to which the contour cut-out of the clamping jaws 18 associated with the in-running rope strand 11 is larger viewed in cross-section than the clamping contour cut-out associated with the other rope strand 12. The clamping apparatus 26 can in particular also have the property that only the turned back rope strand 12 is clamped while the clamping jaws 18 only act as a rope guide in the region of the rope strand 11 without actually clamping the rope strand 11.

Alternatively or additionally to the described different configuration of the clamping jaw sections shown in FIG. 11 for the different rope strands 11 and 12, the rope guiding passages 13 and 14 with which the clamping jaws 18 cooperate can be formed differently, in particular such that the rope guiding passage 13 that receives the rope strand 11 running from the rope leadthrough 10 toward the rope clamping lock 21 is larger and/or deeper and/or wider viewed in cross-section than the rope guiding passage 14 receiving the turned rope strand 12. With such a different configuration of the rope guiding passages 13 and 14, symmetrical clamping jaws 18 that are of the same design on both sections can be used so that an incorrect assembly with an incorrect orientation of the clamping jaws 18 can be simply prevented.

The automatic retensioning of the rope 8 is further amplified by the different rope clamping forces at the different rope strands 11 and 12 because the total rope pull force presses the wedge-shaped deflection block 22 into the joint of the clamping block 23. At the same time, the risk of an incorrect tightening of the clamping means of the clamping jaws 18 is prevented when the clamping jaws 18 are tightened until contact or are all fastened with the same preload force. A distinguishing between clamping screws disposed at the top and disposed at the bottom by the operating staff is not necessary.

The invention claimed is:

1. A hoist drum for a fiber rope drive having a drum jacket body for winding up fiber rope, having guide plates encompassing the drum jacket body, and having a rope end fastening apparatus for fastening a rope end to the hoist drum, wherein the rope end fastening apparatus has two strand guiding passages that are disposed next to one another and that lead to a rope deflection element at which the rope end is turned around and back so that a respective rope strand comes to lie in the rope guiding passages; and further comprising a clamping apparatus associated with the strand guiding passages for clamping at least the turned back rope strand in the strand guiding passage associated therewith;

wherein the clamping apparatus comprises a plurality of clamping jaws that are spaced apart from one another in a rope pull direction, that extend over the rope guiding passages, and that are tensioned by a preload force onto the rope guiding passages; and wherein the rope deflection element has a rope clamping lock that is self-clamping under rope pull and that has a clamping block in a fixed position in the rope pull direction and a deflection block that is movably supported in the rope pull direction and that is movable against the clamping block under rope pull.

2. The hoist drum in accordance with claim 1, wherein the clamping apparatus has rope contact contours that are designed such that the rope strands are pressed both against one another and against a wall of the strand guiding passages.

3. The hoist drum in accordance with claim 1, wherein the strand guiding passages merge into one another and have a common tub-shaped passage base that is approximately U-shaped in cross-section; and/or wherein rope contact contours of the clamping apparatus have a common tub-shaped clamping jaw top that is approximately U-shaped, with a width of the passage base and/or of the clamping jaw top between lateral boundary flanks of the passage base and/or of the clamping jaw top being smaller than or equal to twice a rope diameter of an unloaded, non-deformed rope and with a height of the rope guiding passage between the passage base and the clamping jaw top being smaller than the rope diameter of the non-deformed, unloaded rope.

4. The hoist drum in accordance with claim 1, wherein the rope guiding passages are separate and/or spaced apart from one another such that the rope strands received in the rope guiding passages are separately clamped and/or are acted on by different clamping forces and/or are spaced apart from one another.

5. The hoist drum in accordance with claim 1, wherein the rope deflection element is configured in the form of a rigid deflection post arranged at a fixed position at the hoist drum.

6. The hoist drum in accordance with claim 5, wherein a collar is associated with the deflection post and covers the rope turned around the deflection post, with the collar adjustable in the longitudinal direction of the deflection post and configured as preloadable for clamping the rope turned around the deflection post.

7. The hoist drum in accordance with claim 1, wherein the clamping block has a receiving pocket in which the deflection block is at least sectionally received and is displaceably arranged.

8. The hoist drum in accordance with claim 1, wherein the deflection block has rope contact surfaces arranged at oppositely disposed sides; and wherein the clamping block has rope clamping contours that surround the deflection block and that are arranged disposed opposite the rope contact surfaces of the deflection block so that a gap-shaped rope passage is formed between the deflection block and the clamping block for the rope turned around the deflection block.

9. The hoist drum in accordance with claim 8, wherein the rope clamping contours of the clamping block and/or the rope contact surfaces of the deflection block taper in the rope pull direction in wedge shape and/or in funnel shape.

10. The hoist drum in accordance with claim 9, wherein the rope clamping contours of the clamping block and/or the rope contact surfaces of the deflection block have a wedge angle in the range of 2×3° to 2×20.

11. The hoist drum in accordance with claim 1, wherein the clamping apparatus is configured such that the two rope strands are acted on by different clamping forces.

12. The hoist drum in accordance with claim 11, wherein the clamping apparatus has clamping jaws that are associated with the rope strands and that have preload bolts that are separately associated with the rope strands and that are preloadable by different amounts so that different clamping forces are set at the different rope strands by different amounts of preload of the preload bolts associated with the different rope strands.

13. The hoist drum in accordance with claim 12, wherein the rope guiding passages and/or clamping jaws of the clamping apparatus are individually contoured in a manner differing from one another for each of the rope strands such that a rope leadthrough passage for one of the rope strands that is defined between the associated rope guiding passage and the clamping jaws has a larger height and/or a greater width and/or a larger cross-section than a rope guiding passage for the other rope strand that is defined between the associated rope guiding passage and the clamping jaws.

14. The hoist drum in accordance with claim 1, wherein the rope end fastening apparatus is arranged on an outer side of a guard.

15. The hoist drum in accordance with claim 1, wherein the rope end fastening apparatus, including the clamping apparatus and the rope deflection element, forms a pre-assembled installation that is installable as a unit on one of the guide plates.

16. The hoist drum in accordance with claim 1, wherein the plurality of clamping jaws comprise three to ten clamping jaws.

17. A fiber rope drive having a hoist drum having a drum jacket body, having guide plates encompassing the drum jacket body, and having a rope end fastening apparatus for fastening a rope end to the hoist drum, wherein the rope end fastening apparatus has two strand guiding passages that are disposed next to one another and that lead to a rope deflection element at which the rope end is turned around and back so that a respective rope strand comes to lie in the rope guiding passages; and further comprising a clamping apparatus associated with the strand guiding passages for clamping at least the turned back rope strand in the strand guiding passage associated therewith; and having a fiber rope comprising plastic fibers;
  wherein the rope deflection element has a rope clamping lock that is self-clamping under rope pull and that has a clamping block in a fixed position in the rope pull direction and a deflection block that is movably supported in the rope pull direction and that is movable against the clamping block under rope pull;
  wherein the clamping apparatus is configured such that the two rope strands are acted on by different clamping forces;
  wherein the rope guiding passages and/or clamping jaws of the clamping apparatus are individually contoured in a manner differing from one another for each of the rope strands such that a rope leadthrough passage for one of the rope strands that is defined between the associated rope guiding passage and the clamping jaws has a larger height and/or a greater width and/or a larger cross-section than a rope guiding passage for the other rope strand that is defined between the associated rope guiding passage and the clamping laws.

18. A hoist drum for a fiber rope drive having a drum jacket body for winding up fiber rope, having guide plates encompassing the drum jacket body, and having a rope end fastening apparatus for fastening a rope end to the hoist drum, wherein the rope end fastening apparatus has two strand guiding passages that are disposed next to one another and that lead to a rope deflection element at which the rope end is turned around and back so that a respective rope strand comes to lie in the rope guiding passages; and further comprising a clamping apparatus associated with the strand guiding passages for clamping at least the turned back rope strand in the strand guiding passage associated therewith;
  wherein the clamping apparatus comprises a plurality of clamping jaws that are spaced apart from one another in a rope pull direction, that extend over the rope guiding passages, and that are tensioned by a preload force onto the rope guiding passages;

wherein the rope deflection element has a rope clamping lock that is self-clamping under rope pull and that has a clamping block in a fixed position in the rope pull direction and a deflection block that is movably supported in the rope pull direction and that is movable against the clamping block under rope pull;

wherein the deflection block has rope contact surfaces arranged at oppositely disposed sides; and wherein the clamping block has rope clamping contours that surround the deflection block and that are arranged disposed opposite the rope contact surfaces of the deflection block so that a gap-shaped rope passage is formed between the deflection block and the clamping block for the rope turned around the deflection block;

wherein the rope clamping contours of the clamping block and/or the rope contact surfaces of the deflection block taper in the rope pull direction in wedge shape and/or in funnel shape; and wherein the rope clamping contours of the clamping block and/or the rope contact surfaces of the deflection block have a wedge angle in the range of 2×5° to 2×15°.

* * * * *